C. ELLIS.
PROCESS OF CHLORINATING AROMATIC HYDROCARBONS INCLUDING TOLUOL.
APPLICATION FILED FEB. 12, 1913. RENEWED NOV. 27, 1914.

1,146,142. Patented July 13, 1915.

WITNESSES

INVENTOR
Carleton Ellis
BY
Duncan & Duncan ATTORNEYS

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

PROCESS OF CHLORINATING AROMATIC HYDROCARBONS INCLUDING TOLUOL.

1,146,142.   Specification of Letters Patent.   Patented July 13, 1915.

Application filed February 12, 1913, Serial No. 747,848. Renewed November 27, 1914. Serial No. 874,360.

*To all whom it may concern:*

Be it known that I, CARLETON ELLIS, a citizen of the United States, and resident of Montclair, Essex county, New Jersey, have made certain new and useful Inventions Relating to Processes of Chlorinating Aromatic Hydrocarbons Including Toluol, of which the following is a specification, taken in connection with the accompanying drawing, which forms part of the same.

These inventions relate especially to the chlorination of toluol in the manufacture of benzyl chlorid by the continuous circulation of an excess of toluol through the apparatus in which toluol vapor is produced and acted upon at high temperature by chlorin in the presence of a volatile traveling catalyzer to promote side chain chlorination at a rapid rate under the action of ultra-violet mercury light, for example, and then condensing the benzyl chlorid and excess of toluol remaining to return the same to the apparatus while the hydrochloric acid is substantially eliminated in gaseous condition. Of course by using an excess of chlorin instead of toluol nuclear chlorination is promoted, producing benzal-chlorid, benzo-trichlorid, chlor-benzol and chlor-toluol and other aromatic hydrocarbons or other bodies may with advantage in many cases be chlorinated along similar lines.

Figure 1:
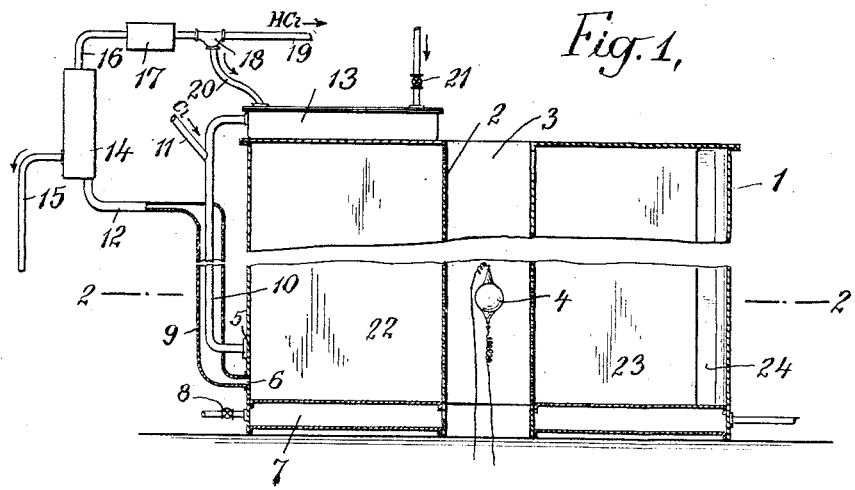
Figure 2:
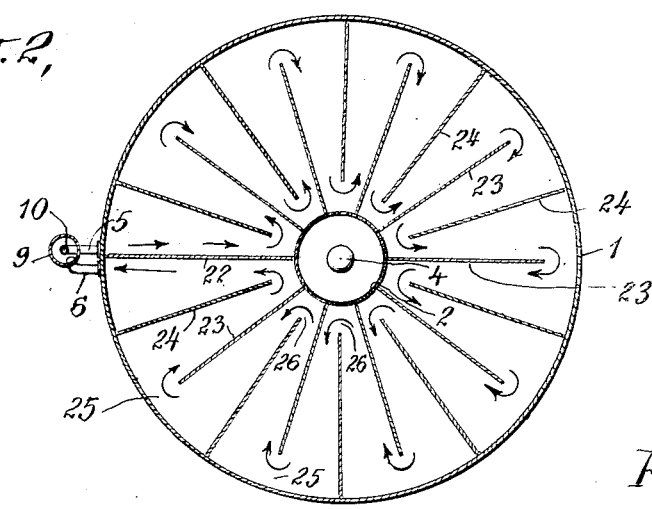
Figure 3:
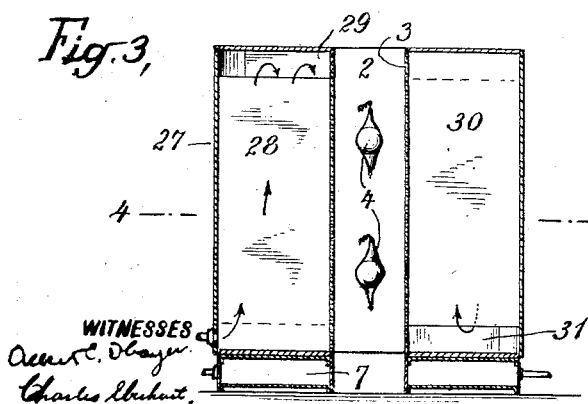
Figure 4:
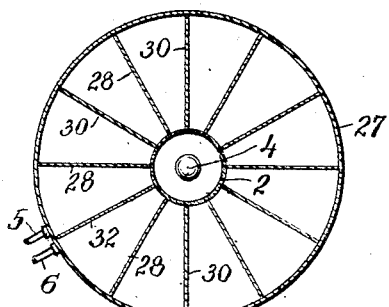

In the accompanying drawing showing in a somewhat diagrammatic way several illustrative forms of apparatus suitable for carrying out this invention, Figure 1 is a vertical section of one form of apparatus. Fig. 2 is a horizontal section through the same along the line 2—2 of Fig. 1. Fig. 3 is a vertical section of another form of conversion chamber; and Fig. 4 is a section thereof along the line 4—4 of Fig. 3.

The toluol may be vaporized in any desired form of apparatus, such for example, as the vaporizer or flash-pan 13 which may be suitably heated initially in any way as by steam or other heating means and which under working conditions is heated by extending over a sufficient portion of the upper surface of the conversion chamber 1 which is maintained at sufficient temperature to supply in large part at least the heat for vaporization in this way. The toluol is continuously or intermittently supplied to this vaporizer as by the valved inlet pipe 21 and the catalyzing material preferably in the form of phosphorous trichlorid or other catalytic material capable of traveling throughout the system in vaporous condition or otherwise, together with the toluol vapor, may also be supplied in desired amounts through the same inlet or otherwise. The vaporized toluol and catalyzer are discharged through the vapor pipe 10 and connected inlet pipe 5 into any suitable reaction or conversion chamber and are preferably mixed with the desired relatively small proportion of chlorin before entering the same, the chlorin if desired entering the vapor pipe 10 through the chlorin inlet 11 so as to be substantially uniformly mixed with the toluol in this way.

The conversion chamber may be of any desired form or construction so as to keep the vaporous material at the desired high temperature while traveling through the conversion chamber so as to secure as far as possible uniformity of the desired chlorination action which may be considerably promoted by exposing the vaporous reacting materials and intermixed traveling and substantially transparent catalyzer to the action of ultra-violet light emitted from a coöperating mercury arc lamp, for instance, which when operated at unusually high voltages, such as 500 to 1000 volts or so, gives a large proportion of ultra-violet radiation which can be readily transmitted through the quartz glass which should be used for the lamp body and other partitions through which this light must pass.

The conversion chamber may be conveniently arranged in cylindrical form and provided with a substantially cylindrical outer casing, such as 1, and an inner substantially cylindrical casing 2 which may with advantage be formed in whole or part of quartz glass, both of which casings may be secured in any desired way with the top and bottom members of the conversion chamber. In order to promote the conversion action on the vaporized charge within the chamber suitable substantially radial partitions may with advantage be arranged within the chamber, leaving spaces or passages 25, 26 alternately adjacent the outer and central portions, as indicated in Fig. 2, so as to guide the material entering the vapor inlet pipe 5 adjacent the separating partition 22 along the staggered path indicated by the arrows past this series of inner and outer partitions 23, 24 until the material has passed part way or completely around the conversion chamber so as to be discharged from one or more vapor outlets such as 6. These partitions may be conveniently made of glass and the entire conversion chamber should of course be lined either with glass or with some other suitable material sufficiently resistant to the vapors so as not to undesirably react therewith or at least be free from objectionable reaction products. One or more ultra-violet lights, such as the high potential mercury light 4 may be arranged within the lighting chamber 3 inside the inner casing so as to promote the desired side chain chlorinating action of the chlorin on part of the toluol vapor which is preferably present to the extent of several times the quantity required to react with the chlorin supplied. For good results the chlorin need only be supplied to the extent required to react with 25 to 50 per cent. of the toluol passing through the system. This desired side chain chlorination is also promoted and the rapidity of the reaction greatly increased by maintaining the vaporous charge at high temperatures, between about 180° and 220° C. for instance, giving desirable results, the upper temperature limit being that at which undesirable disintegration of the toluol or formation of tar or other undesirable products therefrom begins to take place. The lower temperature limit is the condensing temperature of the benzyl chlorid or other reaction components or products, although it is desirable to keep the conversion chamber considerably above this point for most efficient and rapid results. The conversion chamber or gaseous charge fed thereto may be heated in any desired way and as indicated a suitable heater 7 may be arranged below the conversion chamber so as to heat the same by superheated steam or other gaseous material supplied thereto through suitable pipes, such as 8, and it is of course understood that the outer casing of this conversion chamber may be formed of special thickness or material as to minimize diffusion of heat therefrom, heavy lagging being desirable for this purpose in many cases. The vaporous charge may also be heated before entering the conversion chamber by heat interchangers of any desired character such as diagrammatically illustrated in Fig. 1 where the vapor pipe 10 is shown as passing through the enlarged heat interchanging jacket 9 with which the vapor outlet pipe 6 communicates so that the incoming vapor is heated by the hot outgoing or discharge vapors which are then carried by the pipe 12 to the dephlegmator 14 where they are allowed to cool sufficiently to condense substantially all the benzyl chlorid and other desirable chlorinated products, such as the relatively small proportion of benzal chlorid which may be produced, especially when the conversion takes place at relatively lower temperatures. The benzyl chlorid and so forth may be allowed to escape from the dephlegmator through the discharge pipe 15 and the remaining vaporous material may pass through the pipe 16 into any suitable condenser illustrated as 17 where the temperature is sufficiently reduced to condense the toluol and catalyzer which are separated by the trap or separator 18 and returned through the pipe 20 to the vaporizer 13 while the hydrochloric acid gas which is a by-product of the reaction is discharged in gaseous condition through the pipe 19 for utilization in any desired way. In this way it will be seen that the phosphorous trichlorid catalyzer in vaporous condition is intermixed with the vaporized toluol throughout its passage through the conversion chamber so as to be fully effective in promoting the desired chlorination and the excess of toluol present seems to be beneficial in preventing the catalyzer from becoming converted into higher chlorids which appear to be less suitable, even aside from their relatively less volatile character.

Figs. 3 and 4 show another form of conversion chamber in which the outer casing 27 may also be cylindrical and in which the inner casing 2 of quartz glass or the like may be arranged to provide an inner chamber or passage 3 for suitable ultra-violet mercury lights 4 or other suitable lights, such as high power carbon electrode arc lights which may also be used with good results in some cases. In this instance the conversion chamber is provided with a separating partition 32 extending between the outer and inner casings so as to substantially prevent passage of the vaporous charge directly from the inlet 5 to the outlet 6 and the other partitions 28, 30 may as indicated extend all the way from the central to the outer casings, but be provided with openings 29, 31 alternately at the top and bottom of the conversion chamber so as to guide the charge up and down through this staggered passage and effect its substantially uniform conversion.

This invention has been described in connection with a number of illustrative forms of apparatus, parts, arrangements, materials, proportions, temperatures and treating conditions and agents, to the details of which disclosure the invention is not of course to be limited, since

What is claimed is:

1. The process of making benzyl chlorid which comprises continuously vaporizing toluol and phosphorous trichlorid, in continuously supplying chlorin gas to said vapors in amounts sufficient to combine with between about 25 and 50 per cent. of said toluol vapor, in maintaining said mixed vaporous charge of toluol, chlorin and incorporated substantially transparent catalyzer at temperatures between about 180° C. and 220° C. and in simultaneously passing said heated vaporized charge through staggered passages while subjecting the same to the action of ultra-violet light to form benzyl chlorid and hydrochloric acid, in heating the incoming charge by the converted hot outgoing charge, in condensing and separating benzyl chlorid from the converted vaporous charge, in condensing and separating therefrom toluol and catalyzer and returning the same for further vaporization and treatment, in separating and discharging hydrochloric acid and in continuously supplying additional toluol to the condensed toluol before again vaporizing the same.

2. The process of making benzyl chlorid which comprises continuously vaporizing toluol and phosphorous trichlorid, in continuously supplying chlorin gas to said vapors in amounts sufficient to combine with between about 25 and 50 per cent. of said toluol vapor, in maintaining said mixed vaporous charge of toluol, chlorin and incorporated substantially transparent catalyzer at temperatures between about 180° C. and 220° C. while subjecting the same to the action of ultra-violet light to form benzyl chlorid and hydrocloric acid, in condensing and separating benzyl chlorid from the converted vaporous charge, in condensing and separating therefrom toluol and catalyzer and returning the same for further vaporization and treatment, in separating and discharging hydrochloric acid and in continuously supplying additional toluol to the condensed toluol before again vaporizing the same.

3. The process of making benzyl chlorid which comprises continuously vaporizing toluol and phosphorous trichlorid, in continuously supplying chlorin gas to said vapors in amounts sufficient to combine with between about 25 and 50 per cent. of said toluol vapor, in maintaining said mixed vaporous charge of toluol, chlorin and incorporated substantially transparent catalyzer at temperatures between about 180° C. and the point of undesirable heat decomposition of the toluol and tar formation therefrom while subjecting the same to the action of ultra-violet light to form benzyl chlorid and hydrocloric acid, in condensing and separating benzyl chlorid from the converted vaporous charge, in condensing and separating therefrom toluol and catalyzer and returning the same for further vaporization and treatment, in separating and discharging hydrochloric acid and in continuously supplying additional toluol to the condensed toluol before again vaporizing the same.

4. The process of making benzyl chlorid which comprises vaporizing toluol and phosphorous trichlorid, in supplying chlorin gas to said vapors in amounts sufficient to combine with only a portion of said toluol vapor, in maintaining said mixed vaporous charge of toluol, chlorin and incorporated substantially transparent catalyzer at temperatures between about 180° C. and the point of undesirable heat decomposition of the toluol and tar formation therefrom while subjecting the same to the action of ultra-violet light to form benzyl chlorid and hydrochloric acid, in condensing and separating benzyl chlorid from the converted vaporous charge, in condensing and separating therefrom toluol and catalyzer and returning the same for further vaporization and treatment, in separating and discharging hydrochloric acid and in supplying additional toluol to the condensed toluol before again vaporizing the same.

5. The process of chlorinating aromatic hydrocarbons including toluol which comprises continuously vaporizing the hydrocarbon and volatile phosphorous trichlorid catalyzer, in continuously supplying chlorin gas to said vapors in amounts sufficient to combine with only a portion of said hydrocarbon vapor, in maintaining said mixed vaporous charge of hydrocarbon, chlorin and incorporated substantially transparent catalyzer at temperatures between about 200° C. and the temperature of undesirable heat decomposition and tar formation of the hydrocarbons and in simultaneously passing said heated vaporized charge through staggered passages while subjecting the same to the action of ultra-violet light to form chlorinated hydrocarbon and hydrochloric acid, in heating the incoming charge by the converted hot outgoing charge, in condensing and separating chlorinated hydrocarbon from the converted vaporous charge, in condensing and separating chlorinated hydrocarbon from the converted vaporous charge, in condensing and separating therefrom unchlorinated hydrocarbon and catalyzer and returning the same for further vaporization and treatment and in separating and discharging hydrochloric acid and in continuously supplying additional hydrocarbon before again vaporizing the same.

6. The process of chlorinating aromatic hydrocarbon which comprises vaporizing the hydrocarbon and volatile phosphorous trichlorid catalyzer, in supplying chlorin gas to said vapors in amounts sufficient to combine with only a portion of said hydrocarbon vapor, in maintaining said mixed vaporous charge of hydrocarbon, chlorin and incorporated substantially transparent catalyzer at temperatures between about 200° C. and the temperature of undesirable heat decomposition and tar formation of the hydrocarbon while subjecting the same to the action of ultra-violet light to form chlorinated hydrocarbon and hydrochloric acid, in condensing and separating chlorinated hydrocarbon from the converted vaporous charge, in condensing and separating therefrom unchlorinated hydrocarbon and catalyzer and returning the same for further vaporization and treatment and in separating and discharging hydrochloric acid and in supplying additional hydrocarbon before again vaporizing the same.

7. The process of chlorinating aromatic hydrocarbon which comprises vaporizing the hydrocarbon and volatile catalyzer, in supplying chlorin gas to said vapors in amounts sufficient to combine with only a portion of said hydrocarbon vapor, in maintaining said mixed vaporous charge of hydrocarbon, chlorin and incorporated substantially transparent catalyzer at temperatures between the vaporizing temperatures of said catalyzer and the chlorinated hydrocarbon products formed and the temperature of undesirable heat decomposition and tar formation of the hydrocarbon while subjecting the same to the action of ultra-violet light to form chlorinated hydrocarbon and hydrochloric acid, in condensing and separating chlorinated hydrocarbon from the converted vaporous charge, in condensing and separating therefrom unchlorinated hydrocarbon and catalyzer and returning the same for further vaporization and treatment and in separating and discharging hydrochloric acid and in supplying additional hydrocarbon before again vaporizing the same.

8. The process of chlorinating aromatic hydrocarbons which comprises continuously vaporizing the hydrocarbon and volatile catalyzer, in continuously supplying chlorin gas to said vapors in amounts sufficient to combine with only a portion of said hydrocarbon vapor, in maintaining said mixed vaporous charge of hydrocarbon, chlorin and incorporated substantially transparent catalyzer at temperatures above the vaporizing temperatures of said catalyzer and of the chlorinated hydrocarbon product formed and below the temperature of tar formation and undesirable heat decomposition of the hydrocarbon and in simultaneously feeding said heated vaporized charge forward while converting the same to form chlorinated hydrocarbon by the action of ultra-violet light, in heating the incoming charge by the converted hot outgoing charge, in separating chlorinated hydrocarbon from the converted vaporous charge, and in separating therefrom unconverted hydrocarbon and catalyzer and returning the same for further vaporization and treatment.

9. The process of chlorinating aromatic hydrocarbons which comprises continuously vaporizing the hydrocarbon and volatile catalyzer, in continuously supplying chlorin gas to said vapors in amounts sufficient to combine with only a portion of said hydrocarbon vapor, in maintaining said mixed vaporous charge of hydrocarbon, chlorin and incorporated substantially transparent catalyzer at temperatures above the vaporizing temperatures of said catalyzer and of the chlorinated hydrocarbon product formed and below the temperature of tar formation and undesirable heat decomposition of the hydrocarbon and in simultaneously feeding said heated vaporized charge forward while converting the same to form chlorinated hydrocarbon by the action of light, in separating chlorinated hydrocarbon from the converted vaporous charge, and in separating therefrom unconverted hydrocarbon and catalyzer and returning the same for further vaporization and treatment.

10. The process of chlorinating aromatic hydrocarbons which comprises continuously vaporizing the hydrocarbon and volatile catalyzer, in continuously supplying chlorin gas to said vapors, in maintaining said mixed vaporous charge of hydrocarbon, chlorin and incorporated substantially transparent catalyzer at temperatures above the vaporizing temperatures of said catalyzer and of the chlorinated hydrocarbon product formed and below the temperature of tar formation and undesirable heat decomposition of the hydrocarbon, and in simultaneously feeding said heated vaporized charge forward while converting the same to form chlorinated hydrocarbon, in separating chlorinated hydrocarbon from the converted vaporous charge, and in separating therefrom unconverted hydrocarbon and catalyzer and returning the same for further vaporization and treatment.

11. The process of chlorinating aromatic hydrocarbons which comprises vaporizing the hydrocarbon and volatile catalyzer, in supplying chlorin gas to said vapors, in maintaining said mixed vaporous charge of hydrocarbon, chlorin and incorporated substantially transparent catalyzer at temperatures above the vaporizing temperatures of said catalyzer and of the chlorinated hydrocarbon product formed and below the temperature of tar formation and undesirable heat decomposition of the hydrocarbon, and in simultaneously feeding said heated vaporized charge forward while converting the same to form chlorinated hydrocarbon, in separating chlorinated hydrocarbon from the converted vaporous charge, and in separating therefrom unconverted hydrocarbon and catalyzer and returning the same for further vaporization and treatment.

12. The process of chlorinating aromatic hydrocarbons which comprises vaporizing the hydrocarbon and incorporating therewith volatile substantially transparent catalyzer, in incorporating chlorin with said vapors and in feeding forward said mixed vaporous charge of hydrocarbon, chlorin and incorporated catalyzer and subjecting the same to high conversion temperatures while forming chlorinated hydrocarbon and in separating the chlorinated hydrocarbon from the converted vaporous charge.

13. The process of chlorinating aromatic hydrocarbons which comprises feeding forward a mixture of chlorin and hydrocarbon vapor and incorporated vaporous catalyzer and subjecting the vaporous mixture to a temperature substantially above the point of vaporization of the resulting chlorinated product while conversion takes place.

14. The process of chlorinating aromatic hydrocarbons which comprises feeding forward a mixture of chlorin and hydrocarbon vapor and subjecting the vaporous mixture to a temperature substantially above the point of vaporization of the resulting chlorinated products while conversion takes place.

CARLETON ELLIS.

Witnesses:
HARRY L. DUNCAN,
JESSIE B. KAY.